US007962860B2

(12) United States Patent
Eichner

(10) Patent No.: US 7,962,860 B2
(45) Date of Patent: Jun. 14, 2011

(54) SELECTIVE DETAILED DISPLAY OF DEVICES IN A NETWORK

(75) Inventor: Ingo Eichner, Neustadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 604 days.

(21) Appl. No.: 11/900,889

(22) Filed: Sep. 13, 2007

(65) Prior Publication Data

US 2008/0077886 A1 Mar. 27, 2008

(30) Foreign Application Priority Data

Sep. 21, 2006 (EP) .................................... 06019816

(51) Int. Cl.
*G06F 13/00* (2006.01)
(52) U.S. Cl. ........ 715/853; 715/854; 715/855; 715/856; 715/857; 715/858; 715/859; 715/860; 715/861; 715/862; 715/863; 715/864; 715/865; 715/866; 715/867; 719/313; 345/111
(58) Field of Classification Search .......... 715/200–277, 715/723; 700/701–799, 800–866; 709/201–229; 705/50–79; 726/2; 345/30–79; 719/313
See application file for complete search history.

(56) References Cited

U.S. PATENT DOCUMENTS

| 5,821,937 | A | 10/1998 | Tonelli et al. |
| 5,971,581 | A | 10/1999 | Gretta et al. |
| 7,546,602 | B2 * | 6/2009 | Hejlsberg et al. ............. 719/313 |
| 2002/0013852 | A1 * | 1/2002 | Janik .............................. 709/231 |
| 2002/0113816 | A1 | 8/2002 | Mitchell et al. |
| 2006/0149813 | A1 * | 7/2006 | Janik .............................. 709/203 |
| 2006/0236267 | A1 | 10/2006 | Gierschik et al. |
| 2007/0143398 | A1 * | 6/2007 | Graham ........................ 709/204 |
| 2008/0034406 | A1 * | 2/2008 | Ginter et al. ....................... 726/2 |
| 2008/0281952 | A1 * | 11/2008 | Fedotenko .................... 709/223 |
| 2010/0146393 | A1 * | 6/2010 | Land et al. .................... 715/723 |

OTHER PUBLICATIONS

Cisco Systems; "Getting Started With Cisco Network Assistant"; Jan. 1, 2005; pp. i thru viii, 1-1 thru 4-6 and IN-1 thru IN-3; XP002432063, San Jose, California.

* cited by examiner

Primary Examiner — Ruay L Ho

(57) ABSTRACT

There is described a method, to a program and to a system for graphically displaying and projecting at least one network of devices of an automation system, a high density of information usually occurring at the user interface. To allow a user to selectively display devices in a network, in addition to a large quantity of overview information, a solution is proposed in which a user can display individual devices in more detail in an overview. The user can therefore select a device, the instantaneously non-visible details of which he wishes to access, and change the appearance of the device from a not very detailed display to a very detailed display by way of further interaction. This applies to any desired number of devices which can be simultaneously displayed in detail. One advantage is that the network interfaces of devices may also be displayed which cannot be displayed with all network interfaces in the overview without the user being forced to have to change to a different, detail-oriented view.

18 Claims, 1 Drawing Sheet

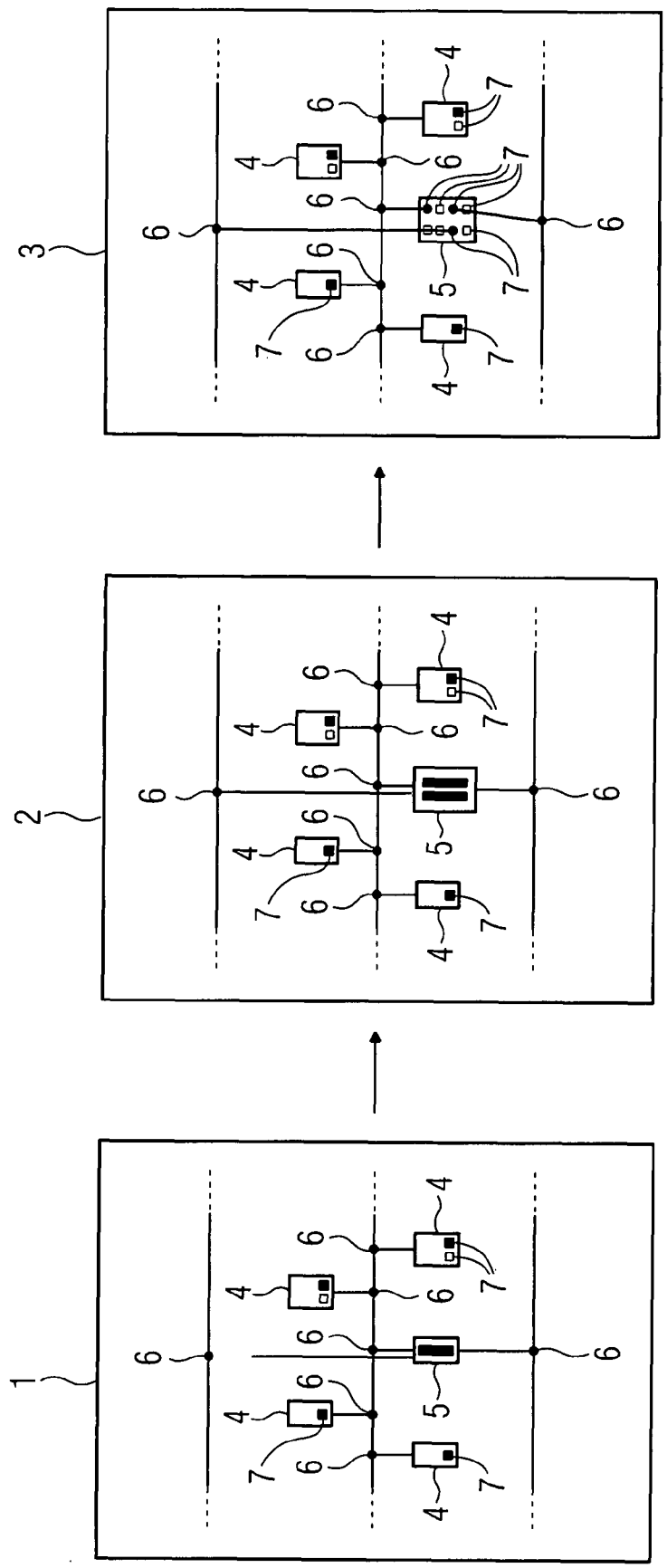

SELECTIVE DETAILED DISPLAY OF DEVICES IN A NETWORK

CROSS REFERENCE TO RELATED APPLICATIONS

This application claims priority of European Patent Office application No. 06019816.5 EP filed Sep. 21, 2006, which is incorporated by reference herein in its entirety.

FIELD OF INVENTION

The invention relates to a method, to a program and to a system for graphically displaying and engineering at least one network of devices of an automation system.

BACKGROUND OF INVENTION

A method or program or system of this kind is used in graphically displaying and engineering large networks in an automation environment where there is usually a high density of information at the user interface. High information densities are difficult for an operator or user to capture, i.e. there is a need to keep them low (central usability approach). A common main requirement lies in presenting the user with a large quantity of overview information. Specifically this means that it must be possible to display an overview of one or more network(s) (a large number of devices and networks) and make them interactively accessible to the user.

The user should graphically connect the devices together and add them to or remove them from existing networks. For this purpose he clicks for example using a mouse on a network interface of a device, drags the mouse pointer to an existing network line segment or to a network interface of a different device and clicks again there. To give the user a sufficiently large area for interaction with the mouse the network interfaces have to be displayed on a much larger scale in relation to the external proportions of the devices than the area they take up on the real devices. The problem here is that in the case of devices with a plurality of network interfaces the situation can occur where it is no longer possible to display all network interfaces since the external dimensions of the devices (and therewith the available area for the network interfaces) in a view, which provides a user with a large quantity of overview information, is too small.

SUMMARY OF INVENTION

An object underlying the invention is to propose a method, a program and a system that allows a user to selectively display in detail devices in a network, in addition to a large quantity of overview information.

This object is achieved by a method for graphically displaying and engineering at least one network of devices of an automation system, which each comprise at least one network interface,
wherein the at least one network is displayed in an overview in which the network is schematically displayed with the devices and network lines, and in which connections between the devices and to the network lines by way of connecting lines, which are provided with a marking at an end connected to a network line, are displayed,
wherein at least one device is selected by a user in a first step for display in a detailed view, and
wherein display of the detailed view, in which all network interfaces of the respective device are displayed, is activated by the user for the selected devices in a second step.

This object is also achieved by a program or system with the features disclosed in the disclosed claims.

The user can therefore select a device, the instantaneously non-visible details of which (for example the network interfaces) he wishes to access and by further interaction with the system by way of a defined key, mouse click or double click on the device or a control element or by a combination of user actions with the input devices, cause the system to change the appearance of the device from a not very detailed display to a very detailed display. This applies to any desired number of devices which can simultaneously be displayed in detail. The advantage of this invention is that the network interfaces of devices may also be displayed which owing to the above-illustrated problems cannot be displayed in an overview without the user being forced to have to change to a different, detail-oriented view. Displaying the network interfaces is of course a basic requirement for interactive access by the user and therewith for engineering the network.

In an advantageous form of the embodiment at least one device displayed in a detailed view is selected by a user and display of the detailed view is deactivated by the user for the devices displayed and selected in a detailed view. Since devices with a large number of interfaces can be displayed on a significantly larger scale in the detailed view the situation can occur in this case that devices and network lines in the environment of the device now shown on an enlarged scale are concealed thereby. It is therefore necessary for it to be possible to deactivate the detailed view again. In a further embodiment deactivation can for example take place automatically after five seconds of no interaction by the user. The advantage of this embodiment lies in the fact that the user can purposefully select the devices which he no longer requires in a detailed view.

In a further advantageous embodiment devices can be added and removed to/from a network by a user. Existing networks can be expanded and reduced thereby, i.e. can be adapted without problems to the changed circumstances.

In a further advantageous embodiment connections between devices and to network lines can be added to and removed from a network by a user. For this purpose he will for example click on a network interface of a device using the mouse, drag the mouse pointer to an existing network line segment or to a network interface of a different device and click again there. This is also used to adapt a network and is therefore essential to a comprehensive engineering tool.

In a further advantageous embodiment at least one temporary view of the respective device is displayed in a transition phase when the detailed view is activated or deactivated for at least one selected device. The impression of an animated transition can also be generated with a plurality of temporary views. This change in the appearance of the device in a transition phase that may be experienced over time by the user means that the transition from the overview to the detailed view or vice versa is clearer for the user and he is also able to better recognise that previously visible areas are sometimes concealed.

In a further advantageous embodiment inputs by the user are ignored during the transition phase. The user cannot interact with the system therefore, i.e. all user actions are blocked. Possible confusion of the system as a result, for example, of incorrect inputs by the user, such as multiple clicks on a device for zooming, is avoided hereby.

In a further advantageous embodiment the display of the devices is configured so as to correspond to the real devices with respect to their colouring, shape and/or size relative to each other. This is used for identification and re-recognition of the devices by the user, i.e. a user should be able to re-recognise the displayed devices as those which he comes across in the real system. This means for example that devices which physically exist in the form of a cube are displayed as a square. Devices which are tall and narrow are also displayed tall and narrow. The physical sizes of the devices should also be taken into consideration, i.e. devices which are large are displayed larger than devices which are small compared thereto.

In a further advantageous embodiment a numerical value is allocated to the devices and the devices are displayed in the overview so as to given different emphasis as a function of the numerical value. The display can thus also graphically present to the user the different levels of importance of the individual devices. Devices which carry out the actual signal processing (for example a central CPU) are "more important" than devices which forward signals (for example switches) or read them from sensors or output them at the actuator (for example decentralised slave modules of a Profibus network). Therefore the "more important" devices are displayed so as to be emphasised more than the less "important" devices. This can take place by way of example by greater colour saturation or intensified contours or by a disproportionately large display. In the latter case the importance compared with the request for a display corresponding to the relative size and presentation of a large quantity of overview information is compensated for by the system and evaluated to calculate the size of the devices to be displayed.

In a further advantageous embodiment the devices are displayed in the detailed view so as to be given different emphasis as a function of the numerical value. A distinction may therefore also be made at a glance in this view between the more important and less important devices.

BRIEF DESCRIPTION OF THE DRAWING

The invention will be described and explained in more detail hereinafter with reference to the exemplary embodiment shown in the figure, in which:

FIG. 1 shows a transition from an overview to a detailed view of a device in a network.

DETAILED DESCRIPTION OF INVENTION

The left-hand part of FIG. 1 shows in an overview 1 a network of devices 4, 5 of an automation system which each comprise at least one network interface 7. The devices 4, 5 are connected to the network lines by connecting lines which are provided with a marking 6 at the end connected to the network line. The network interfaces 7 can already be seen in the devices 4 in the overview 1. Device 5 on the other hand comprises more network interfaces 7 than can be displayed in this view 1. Device 5 has therefore been selected by a user for enlargement. After activating the display of the detailed view 3 of the selected device 5 a temporary view is displayed in a transition phase 2. In the detailed view 3 the device 5 is presented on a much larger scale than it would be displayed in the view 1 on the basis of its "importance" and its physical size. The consequence of this is that graphical elements, such as adjacent devices 4 or network lines, are sometimes concealed by the device 5 displayed in detail. The device 5 can therefore be freely displaced without the remaining elements of the display being affected thereby, i.e. they remain in their graphical positions. The user can access the accordingly accessible details (specifically: the network interfaces 7) of the device 5 and carry out all admissible actions, such as a change in the allocation of a network interface 7 to a network.

To summarise, the invention relates to a method, to a program and to a system for graphically displaying and engineering at least one network of devices of an automation system, there usually being a high density of information at the user interface. To allow a user a selective detailed display of devices in a network, in addition to a large quantity of overview information, a solution is proposed in which a user can display individual devices in more detail in the overview. The user can therefore select a device, the instantaneously non-visible details of which (for example the network interfaces) he wishes to access, and change the appearance of the device from a not very detailed display to a very detailed display. This applies to any desired number of devices which can be simultaneously displayed in detail. The advantage of this invention is that the network interfaces of devices may also be displayed which cannot be displayed with all network interfaces in the overview without the user being forced to have to change to a different, detail-oriented view.

The invention claimed is:

1. A method for graphically displaying and graphically engineering at least one network of devices of an automation system, comprising:
    displaying the at least one network in a general view;
    displaying schematically devices and network lines within the general view, wherein the devices have at least one network interface;
    displaying connections between the devices and to the network lines with connecting lines, wherein the connecting lines have a marking at an end connected to the network lines;
    selecting, within the general view, at least one device by a user for display in a detailed view; and
    activating, within the general view, the detailed view for the selected device by the user, wherein all network interfaces of the selected device respectively are displayed in the detailed view,
    wherein at least one temporary view of the selected device is displayed in a transition phase when the detailed view is activated.

2. The method as claimed in claim 1, wherein at least one device displayed in the detailed view is selected by the user, and wherein display of the detailed view is deactivated by the user for the devices displayed and selected in the detailed view.

3. The method as claimed in claim 1, wherein devices are added to the network by the user.

4. The method as claimed in claim 1, wherein devices are removed from the network by the user.

5. The method as claimed in claim 1, wherein connections between devices and to network lines are added to the network by the user or are removed from the network by the user.

6. The method as claimed in claim 1, wherein at least one temporary view is displayed in a transition phase when the detailed view is deactivated for the selected device.

7. The method as claimed in claim 6, wherein inputs by the user are ignored during the transition phase.

8. The method as claimed in claim 1, wherein the display of the devices corresponds to the real devices in at least one respect selected from the group consisting of colouring, shape, size and a combination thereof.

9. The method as claimed in claim 1, wherein numerical values are allocated to the devices, and wherein the devices are displayed in the general view with different emphasis based on the given numerical value.

10. The method as claimed in claim 9, wherein the devices are displayed in the detailed view with different emphasis based on the numerical value.

11. A software program to display graphically and to engineer graphically at least one network of devices of an automation system, wherein each of the devices has at least one network interface, wherein the software program is to be executed on a system comprising keys and a mouse to be used by a user, when executed comprising:
displaying the at least one network in a general view;
displaying schematically the devices and network lines within the general view, wherein the devices have at least one network interface;
displaying connections between the devices and to the network lines by way of connecting lines, wherein the connecting lines have a marking at an end connected to the network lines;
providing, within the general view, a selection of at least one device by a user for display in a detailed view; and
providing, within the general view, an activation of the detailed view for the selected device by the user, wherein all network interfaces of the selected device respectively are displayed in the detailed view,
wherein at least one temporary view of the selected device is displayed in a transition phase when the detailed view is activated.

12. The software program as claimed in claim 11, wherein at least one device displayed in the detailed view is selected by the user, wherein display of the detailed view is deactivated by the user for the devices displayed and selected in the detailed view, and wherein devices are addable to or removable from the network by the user.

13. The software program as claimed in claim 12, wherein connections between devices and to network lines are added to the network by the user or a removed from the network by the user.

14. The software program as claimed in claim 13, wherein at least one temporary view of the selected device is displayed in a transition phase when the detailed view is deactivated for the selected device.

15. The software program as claimed in claim 14, wherein inputs by the user are ignored during the transition phase.

16. The software program as claimed in claim 15, wherein the display of the devices corresponds to the real devices in at least one respect selected from the group consisting of colouring, shape, size and a combination thereof.

17. The software program as claimed in claim 16, wherein a numerical value is allocated to the devices, wherein the devices are displayed in the general view with different emphasis based on the given numerical value, and wherein the devices are displayed in the detailed view with different emphasis based on the numerical value.

18. A system to graphically display and to graphically engineer at least one network of devices of an automation system, comprising:
at least one input unit for:
selecting, within a general view, at least one device by a user for display in a detailed view, and
activating, within the general view, the detailed view for the selected device by the user, wherein all network interfaces of the selected device respectively are displayed in the detailed view,
wherein at least one temporary view of the selected device is displayed in a transition phase when the detailed view is activated;
at least one output unit for:
displaying the at least one network in the general view,
displaying schematically the devices and network lines within the general view, wherein the devices have at least one network interface, and
displaying connections between the devices and to the network lines by way of connecting lines, wherein the connecting lines have a marking at an end connected to the network lines; and
a device to execute a software program.

* * * * *